United States Patent [19]
Boezeman et al.

[11] Patent Number: 6,012,068
[45] Date of Patent: *Jan. 4, 2000

[54] MEDIA MANAGER FOR ACCESS TO MULTIPLE MEDIA TYPES

[75] Inventors: John J. Boezeman, Cary; Shawne D. Robinson, Durham, both of N.C.

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/885,304

[22] Filed: Jun. 30, 1997

[51] Int. Cl.$^7$ ........................................... G06F 17/30
[52] U.S. Cl. ........................................ 707/104; 707/204
[58] Field of Search ................... 707/104, 2, 9; 395/183, 187.01, 701; 364/489; 709/219

[56] References Cited

U.S. PATENT DOCUMENTS

| | | | |
|---|---|---|---|
| 5,287,459 | 2/1994 | Gniewek | 369/34 |
| 5,416,914 | 5/1995 | Korngiebel et al. | 711/114 |
| 5,430,872 | 7/1995 | Dahod et al. | 395/600 |
| 5,506,986 | 4/1996 | Healy | 707/204 |
| 5,524,193 | 6/1996 | Covington et al. | 707/512 |
| 5,530,856 | 6/1996 | Dahod et al. | 395/600 |
| 5,598,385 | 1/1997 | Mizukami et al. | 369/36 |
| 5,600,775 | 2/1997 | King et al. | 707/500 |
| 5,729,741 | 3/1998 | Liaguno et al. | 707/104 |
| 5,737,533 | 4/1998 | De Hond | 709/219 |
| 5,742,768 | 4/1998 | Gennaro et al. | 1/1 |
| 5,754,830 | 5/1998 | Butts et al. | 395/500 |
| 5,826,031 | 10/1998 | Nielsen | 395/200.63 |
| 5,857,203 | 1/1999 | Kauffman et al. | 707/200 |
| 5,884,298 | 3/1999 | Smith, II et al. | 707/2 |
| 5,905,981 | 5/1999 | Lawler | 707/4 |

OTHER PUBLICATIONS

Dialog Search Results (41 pages).

*Primary Examiner*—Paul R. Lintz
*Assistant Examiner*—Ella Colbert
*Attorney, Agent, or Firm*—Myers Bigel Sibley & Sajovec; A. Bruce Clay

[57] ABSTRACT

Methods, systems and computer program products are provided which access media objects of a plurality of media types stored at a plurality of locations accessible to a computer system through a common interface. Such a common interface may accept user input requesting a media object. Responsive to the user input requesting a media object, the location of a requested media object is automatically determined based upon an object identifier for the media object. Similarly, the type of media object may be automatically determined based upon the object identifier. The determined location of the requested media object is then accessed to retrieve the media object the retrieved media object is formatted based upon the determined type of media object. User transparent access to animations and media libraries are also provided at both local and remote locations.

34 Claims, 11 Drawing Sheets

MEDIA MANAGER FOR ACCESS TO MULTIPLE MEDIA TYPES

FIELD OF THE INVENTION

The present invention relates to computer systems, and to methods of operating such computer systems attached to a network, such that the computer system can access data and code over the network.

BACKGROUND OF THE INVENTION

The Internet is a decentralized network of computers that can communicate with one another via the TCP/IP (transmission control protocol/internet protocol) network protocol. Although the Internet has its origins in an agency started by the United States Department of Defense in the late 1960's called the U.S. Advanced Research Project Agency (ARPANET), it has only recently become a worldwide communication medium. To a large extent, the explosive growth in use and traffic over the Internet is due to the development in the early 1990's of the worldwide web (WWW), which is one of several service facilities provided on the Internet. Other facilities include a variety of communication services such as electronic mail, telnet, usenet newsgroups, internet relay chat (IRC), a variety of information search services such as WAIS and Archie, and a variety of information retrieval services such as FTP (file transfer protocol) and Gopher. While these facilities have serviced the research-oriented user well, the multimedia capability of the WWW has brought the Internet into prominence.

The WWW is a client-server based facility that includes a number of servers (e.g., computers connected to the Internet) on which web pages or files reside and clients (e.g., web browsers) which interface the users with the web pages. Specifically, web browsers and software applications such as WebExplorer® (IBM Corporation) or Navigator® (Netscape Communication Corporation) send a request over the WWW to a server requesting a web page identified by a universal resource locator (URL) which notes both the server where the web page resides and the file or files on that server which comprise the web page. The server then sends a copy of the requested file(s) to the web browser which displays the web page to the user.

The web pages on the WWW may be hyper-media documents written in a standardized language called hypertext markup language (HTML). Thus, a typical web page includes text together with embedded formatting commands, referred to as tags, which can be used to control the font size, the font style (for example, whether italic or bold), how to weigh up the text, and so on. A web browser parses the HTML script in order to display the text in accordance with the specified format.

In addition, an HTML page can also contain a reference, in terms of another URL, to a piece of multimedia data, for example, an image, a video segment, or an audio file. The web browser responds to such a reference by retrieving and displaying or playing the data. Alternatively, such multimedia data may form its own web page, without any surrounding HTML text. Further information about HTML and the WWW can be found in *World Wide Web* and *HTML* by Douglas MacArthur, pp. 181–26 and *Dr. Dobbs' Journal*, December 1994, and in *The HTML Sourcebook* by Ian Graham, John Wiley Publishers, New York (1995).

As so far described, and broadly speaking as currently implemented, the WWW suffers from the disadvantage that pages downloaded from a server to a client are essentially passive, in other words, they generally do not contain code which is executed at the client machine. One implication of this is that the server cannot offload onto the client any of the processing associated with the interaction between the client and the server. Thus if the client is completing a form with their telephone number for example, then any formal checks such as to the number of digits in the telephone number are generally performed at the server. This may result in a heavier processing burden at the server and in time-consuming extra communications between the server and client should there be any mistakes to correct. Moreover, the inability of the server to download code for execution at the client is a significant limitation on the type of applications that can be created to exploit the WWW.

Recent developments, based particularly on the Java (® Sun Microsystems, Inc.) technology from Sun Microsystems Inc, have sought to overcome the above difficulties. The Java technology comprises primarily (i) a new programming language, somewhat similar to C and C++, and (ii) a virtual machine. Essentially, programs written in the Java programming language can be compiled into byte code form, and then interpreted at runtime on the Java virtual machine. The Java virtual machine converts the byte codes into instructions that can be executed by the underlying physical machine.

Programs written using Java can be downloaded over the WWW in the form of byte codes for execution on a Java virtual machine at the client. Such programs are known as "applets". The use of the Java technology for downloading code over the WWW has two major benefits. An applet can be platform independent, if we assume that each client has a copy of the Java virtual machine (the virtual machine at the client's system is typically incorporated either into the operating system, or into the Web browser itself). In other words, there is no need for a server to have different versions of the code for downloading to clients according to their respective operating systems and machines. Therefore, only a single version of the relevant code needs to be written and maintained, which may simplify software development. Because the applet executes on a virtual machine, rather than a physical machine, security is greatly improved. Thus, when downloading code over the network, there is always a risk that it will include some malicious code (accidentally or otherwise) that may damage data or programs stored at the client. The virtual machine however can monitor the operation of the applet, and so detect and prevent such malicious activity.

It will be noted that the concept of downloading software from a server to a client in the form of byte codes for execution on a virtual machine was also known independently of the Java technology. See for example U.S. Pat. No. 5,347,632.

In order to invoke a Java applet, a Web page of html text contains an <APPLET> tag, which identifies the URL containing the applet. A browser responds to this tag by retrieving and running the applet. Also defined is a <PARAM> tag, which is contained within a pair of corresponding <APPLET> and </APPLET> tags, and which can be used to specify parameters that are passed to the applet at run-time. (Note that the APPLET and PARAM tags are not formally incorporated into the html standard, but are nevertheless recognised by many Web browsers). Further information about the Java technology and applets can be found in "Teach Yourself Java in 21 Days" by Laura Lemay and Charles Perkins (Sams.net Publishing, Indianapolis, Ind., USA, 1996).

Out of an effort to heighten the sensory experience of the WWW, virtual reality modeling language (VRML, pronounced "VER-MEL") was developed. VRML is a standardized language for describing animation and three dimensional modeling of geometric objects. VRML allows a three dimensional scene or world(s) to be manipulated in an interactive manner over the Internet or locally. In either case VRML allows for the creation of virtual environments which may be shared by multiple users. Thus, unlike HTML which provides for relaying and formatting text and images, and for hyperlinks to other web pages, VRML provides for the organization of three dimensional objects and scenes in a hierarchical fashion that may be truly interactive.

What each of these various forms of data on the Internet have in common is the use of multiple media types in their interaction with a user. For example, HTML, Java, or VRML all may utilize images, sound, text and even animations (a series of images successively played for a user) in providing information to a user. The media accessed typically takes the form of media files located locally on a user's computer, on a server connected to the user's computer or on a third party server accessed through the server connected to the user's computer.

Typically, the burden has been placed on the individual programmer to handle the different scenarios that result from the possible locations of media files. This burden has typically been discharged by the programmer writing different code to handle the various possibilities. This code differs for each of the possible scenarios and may also differ depending upon the format of the media file to be accessed.

One traditional manner in which Java applets have dealt with multiple media files is for the programmer to surface the different locations to the end user. The end user then becomes responsible for understanding the complexities of media files being located at one or more of the possible locations. However, such a solution adds complexities to the end user without relieving the programmer of the burden of handling the different file locations.

With respect to accessing particular media types, a particular problem arises with respect to the access of animations. Animations are typically composed of a sequence of image files that are presented in a "flip book" format in order to simulate motion. The tools conventionally used to create animations may force the end user to explicitly specify each of the individual images (or animation cells) of the animation to be created. Alternatively, these tools may force the user to implement one numbering scheme for their image files. Conventional tools also typically limit the number of images that can be specified for use in an animation by a predefined upper bound. In either case, the programmer has surfaced to the end user the rigidity with which they have provided support for grouping and loading image files used in creating animations.

As an example of the conventional management of images, in AimTech's Jamba® an animation is given a first image file name and only nine additional associated image files specified by the numbering scheme that is incorporated in the file name may be incorporated in the animation. Furthermore, conventional tools may only create animations from image files located locally on the user's computer system.

A third concern with respect to media management is support for versions of an application where the only change in the versions is the media content accessed by the application. Conventionally, such versions have been supported by the programmer changing references in the code to match each of the changes in the media content. As is apparent, such a labor intense manner of revision may quickly become costly as the number of different versions supported increases.

In light of the above discussion, a need exists for improvement in the accessing of multiple media types over networks such as the Internet. These improvements are needed in accessing multiple media types, creating animations and supporting various versions of applications.

SUMMARY OF THE INVENTION

In view of the above discussion, it is an object of the present invention to provide for the uniform control of multiple media types.

Another object of the present invention is to provide a simpler interface for programmers creating multimedia programs.

Still another object of the present invention is to provide increased flexibility in media access for multiple media types.

Yet another object of the present invention is to provide such flexibility without increasing the programming requirements of multimedia applications or applets.

These and other objects of the present invention are provided by methods, systems and computer program products which access media objects of a plurality of media types stored at a plurality of locations accessible to a computer system through a common interface. Such a common interface may accept user input requesting a media object. Responsive to the user input requesting a media object, the location of a requested media object is automatically determined based upon an object identifier for the media object. Similarly, the type of media object may be automatically determined based upon the object identifier. The determined location of the requested media object is then accessed to retrieve the media object the retrieved media object is formatted based upon the determined type of media object.

In a particular embodiment of the present invention the determined location is accessed by establishing a connection to the determined location with the type of connection established being based upon the determined type of media object. In such a case, the connection being established may be an audio stream connection if the determined type of the media object is an audio object. Also, the connection being established may be an image stream connection if the determined type of the media object is an image object.

The locations from which media information may be obtained include locations local to the computer system, locations local to a server connected to the computer system and locations local to a third party server accessible through the server connected to the computer system. In particular embodiments, if the requested media object is stored at a third party server, then accessing the determined location may be accomplished by validating the location of the third party server and establishing a connection to the third party. The requested media may then be retrieved from the third party server.

In another embodiment of the present invention, the location of a requested media object based upon an object identifier for the media object comprises the step of evaluating a path specification of a filename of the media object. Similarly, the determination of the type of media object may be based upon the object identifier comprises the step of evaluating an extension of a filename of the media object.

By automatically carrying out the location and retrieval of media information independent of the location specified for the media information, the present invention can make file location transparent to a programmer. Furthermore, by automatically formatting the media information based upon the type of information to be retrieved the formatting of the information can be similarly transparent to the programmer or user. Thus, the present invention allows for access of multiple media types at multiple locations without the need to write dedicated code for each possibility.

In another aspect of the present invention, if it is determined that the type of media object requested is an animation media object then a first of a plurality of images included in the animation media object is retrieved. Consecutively identified images until the next consecutively identified image are then retrieved until a consecutively identified image is unavailable. The consecutively identified images may then be formatted as an animation.

In still another aspect of the present invention, if it is determined that the requested media object is an animation media object, then a first of a plurality of images included in the animation media object is retrieved and a predefined number of the next consecutively identified images are retrieved. The predefined number of retrieved images corresponds to the number of images in the animation. The retrieved images may be formatted as an animation. In a particular embodiment of the present invention, the consecutively identified images are retrieved from a storage location remote from the computer system.

By retrieving images based upon their identifier any number of sequentially numbered images may be incorporated in an animation. Furthermore, by retrieving images based upon a starting image and the number of images in an animation, the animation may be retrieved from remote locations such as a web server. Thus, the present invention overcomes the animation limitations of previous programming interfaces.

In yet another aspect of the present invention the user input includes indices into a media library and media information is retrieved from the library based on the indices. In such a case the disadvantages of revisions to media content between versions of an application may be reduced as only the media library need be revised.

In an object oriented embodiment of the present invention, a media access class is provided which includes media access class information stored in memory. The media class information includes media access program logic for accessing storage locations where the plurality of media types are stored. These storage locations include storage locations local to the computer system, storage locations at a server connected to the computer system or storage locations at a server remote to a server connected to the computer system.

In a further embodiment the media access class further includes media access program logic for determining which type of the media types is stored at a storage location and for formatting the information stored at a storage location based upon the media type stored at the storage location. In such an embodiment, the media access program logic for determining which type of the media types is stored at a storage location may make such determination based upon a file extension in a filename of the stored information. The media access program logic for accessing storage locations may also access a storage location based upon path information and a file identifier contained in a filename of the stored information.

In another embodiment of the present invention, the media access class further includes media access program logic for retrieving animation image files. Such media access program logic for retrieving animation image files may include media access program logic for retrieving sequentially identified image files until a break in the sequence is detected. The media access program logic for retrieving animation image files may also include media access program logic for retrieving sequentially identified image files based upon an initial image file identifier and the number of image files in the animation. The animations image files may, therefore, be retrieved from a location remote from the computer system.

In yet another embodiment of the present invention, the media access class further includes media access program logic for accessing a media content library based upon indices into the media content library.

As will further be appreciated by those of skill in the art, the present invention may be embodied as a method, apparatus/system or computer program product.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As will be appreciated by one of skill in the art, the present invention may be embodied as methods or devices. Accordingly, the present invention may take the form of an entirely hardware embodiment, an entirely software embodiment or an embodiment combining software and hardware aspects.

Throughout the description of the preferred embodiments of the present invention and the summary of the present invention, reference is made to user input. As used herein user input may be direct or indirect in that the input may be directly input by a user or it may be indirectly input by an application run by a user or other application.

Figure 1:
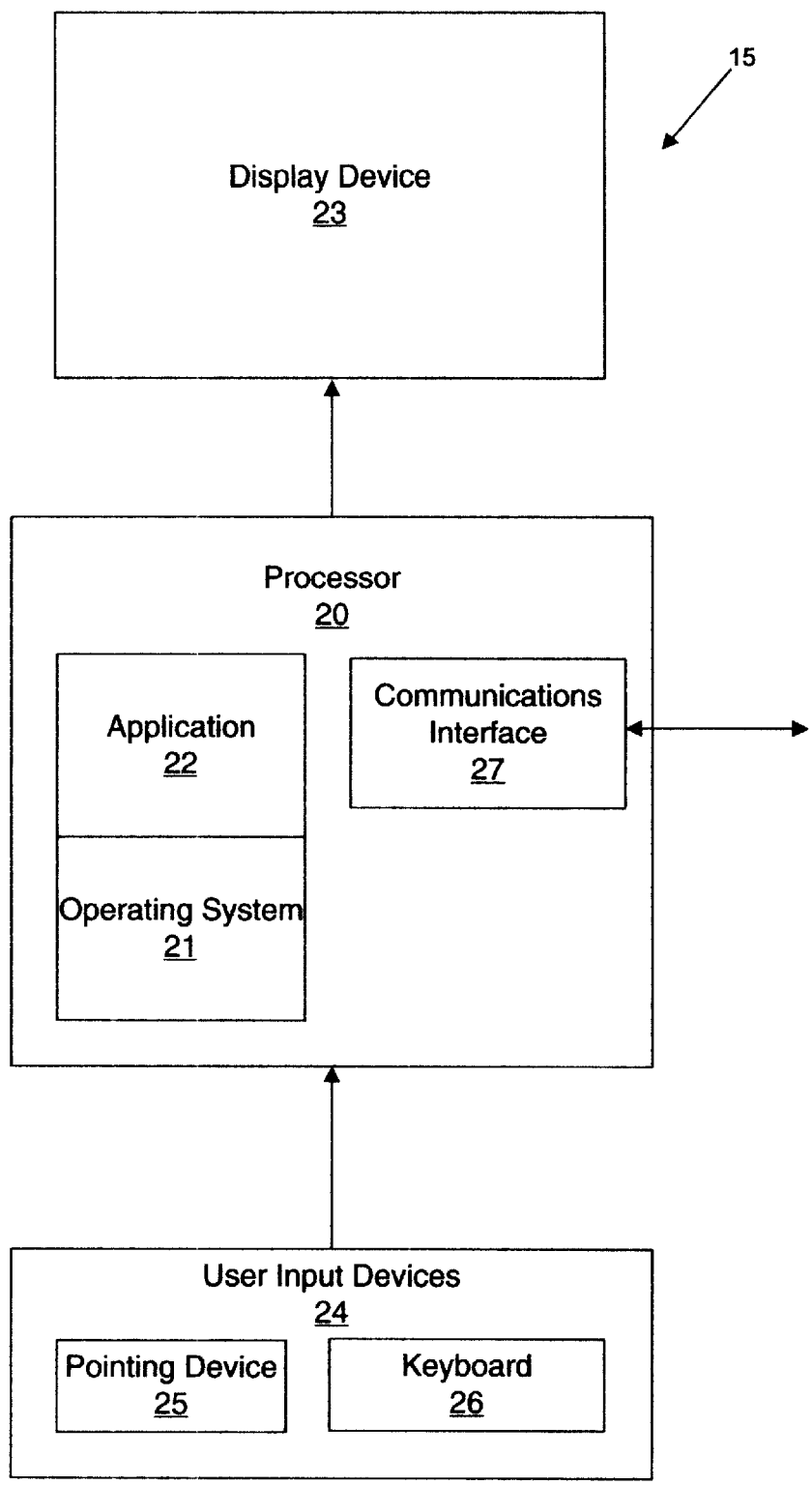
FIG. 1 is block diagram of a processing system utilizing the present invention.

FIG. 1 illustrates a data processing system on which virtual environments according to the present invention may be utilized. As seen in FIG. 1, illustrates a computer system 15 having a data processor 20 which may include an operating system 21 resident in the processor. An application 22 may be running on the operating system 21. The processor 20 displays information on a display device 23. The display device 23 has a plurality of picture elements (collectively referred to as a screen) which may define the appearance of a user interface environment displayed on the display device. For each picture element a color characteristics of that element includes hue, brightness, and saturation values. By manipulation of these values for each picture element of the screen the appearance or contents of the screen is established. The contents of the screen of the display device 23 and, therefore, the appearance of the user interface environment, may be controlled or altered by the application 22 or the operating system 21 either individually or in combination.

For obtaining input from a user, the operating system 21, the application 22 or both may utilize user input devices 24. User input devices 24 may include a pointing device 25 and a keyboard 26 or other input devices known to those of skill in the art. User input devices 24 may be used to provide user input to the application or operating system to control the operation of the computer system 15. Output devices in addition to the display device 23 may also be provided for providing additional output to a user. For example, a sound device and speakers may be utilized to provide audio to a user.

FIG. 1 also illustrates a communications interface 27 associated with the processor 20 which may be utilized to send and receive communications with devices external to the processing system. Communications interface 27 may be a network interface, a modem, a serial port, a parallel port or any other means of sending and receiving information.

Figure 2:
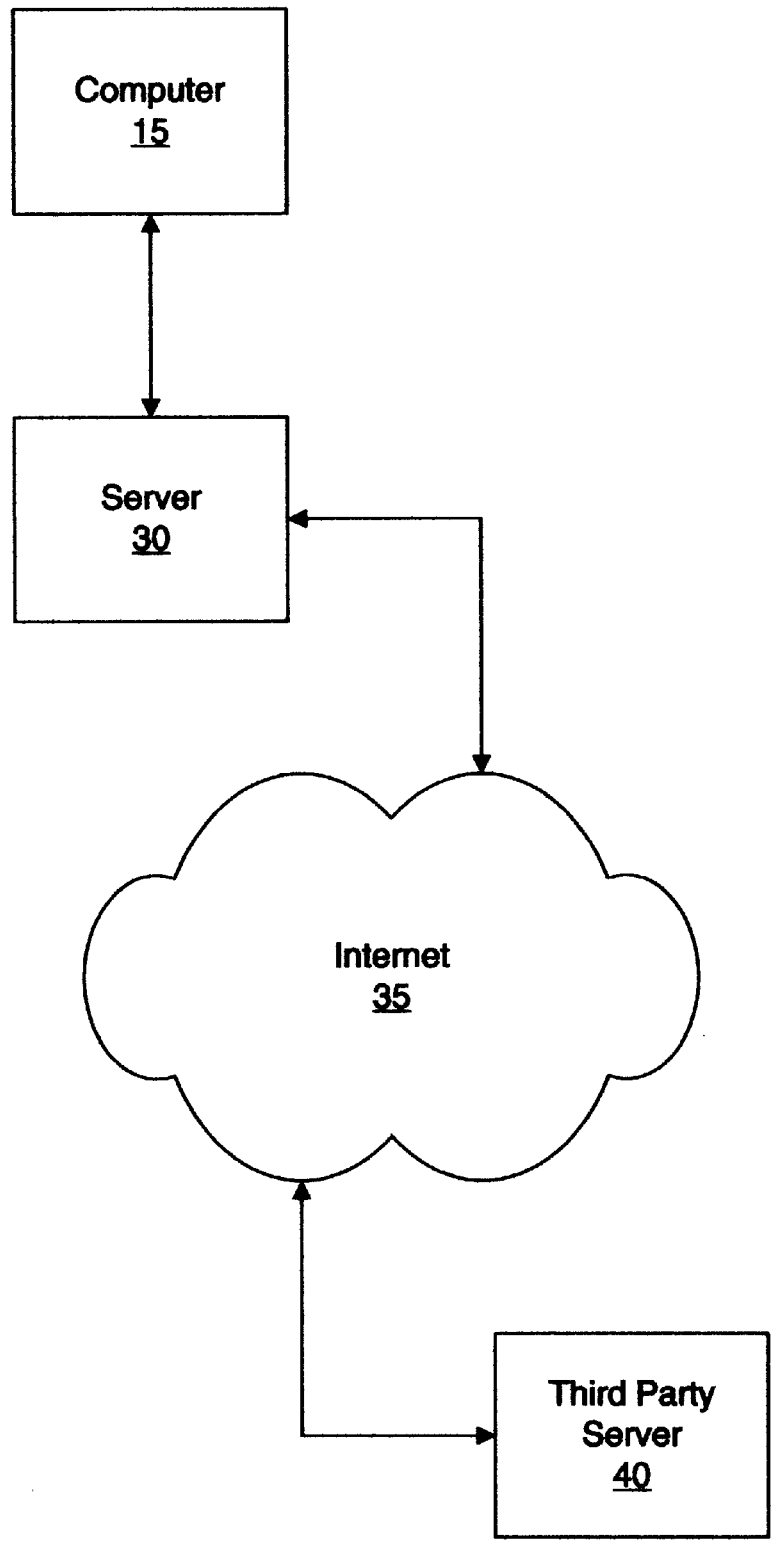
FIG. 2 is a block diagram of a network environment having a processing system utilizing the present invention.

FIG. 2 illustrates how computer system 15 may be interconnected to a network of computers. As seen in FIG. 2, computer system 15 may communicate with a server 30 over its communications interface 27. Server 30 may have access to the Internet and may, therefore, provide access to the Internet from Computer 15. As will be appreciated by those of skill in the art, server 30 may also be a proxy which provides access to the Internet to computer 15. Through its access to the Internet, computer 15 and server 30 may also have access to a third party server 40. Thus, computer system 15 may access information located on computer system 15, on the connected server 30 or on a third party server 40. Utilizing the present invention, the differences in accessing media stored at these various locations may be made transparent to the user.

In operation, the computer system 15 utilizing the present invention may provide transparent access to media files of a plurality of types stored at various locations including locally, on server 30 or on server 40. Furthermore, utilizing aspects of the present invention, computer system 15 may utilize animations of varying numbers of images and with images located on locally, on server 30 or on server 40. Such locations may be made transparent to a programmer creating such animations. Furthermore, according to the present invention, various versions of applications accessing media may be supported without revision to the application.

The present invention will now be described with respect to FIGS. 3 through 6 which are flowchart illustrations of one embodiment of the present invention. It will be understood that each block of the flowchart illustrations, and combinations of blocks in the flowchart illustrations, can be implemented by computer program instructions. These program instructions may be provided to a processor to produce a machine, such that the instructions which execute on the processor create means for implementing the functions specified in the flowchart block or blocks. The computer program instructions may be executed by a processor to cause a series of operational steps to be performed by the processor to produce a computer implemented process such that the instructions which execute on the processor provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based systems which perform the specified functions or steps, or combinations of special purpose hardware and computer instructions.

Figure 3:
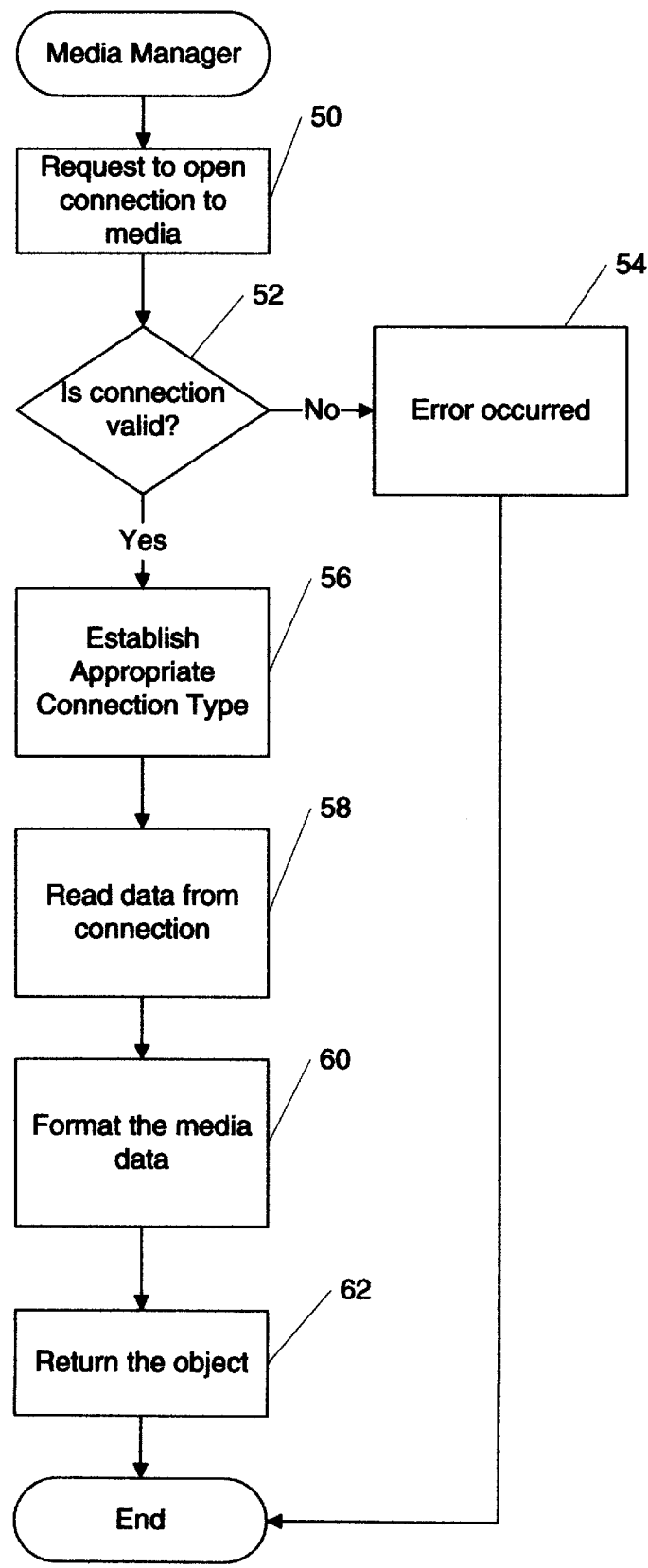
FIG. 3 is a flow chart of the operations of one embodiment of the present invention.

One embodiment of the present invention is illustrated in FIG. 3. As is seen in FIG. 3, a media manager according to the present invention receives a request to access media information (block 50). The media manager validates the request (block 52) and if the request is not valid identifies an error (block 54). The validation of the request may depend upon the location of the requested media. For example, a request to a media object located on an Internet server, such as server 40, may require validation of the URL of the media object.

Figure 4:
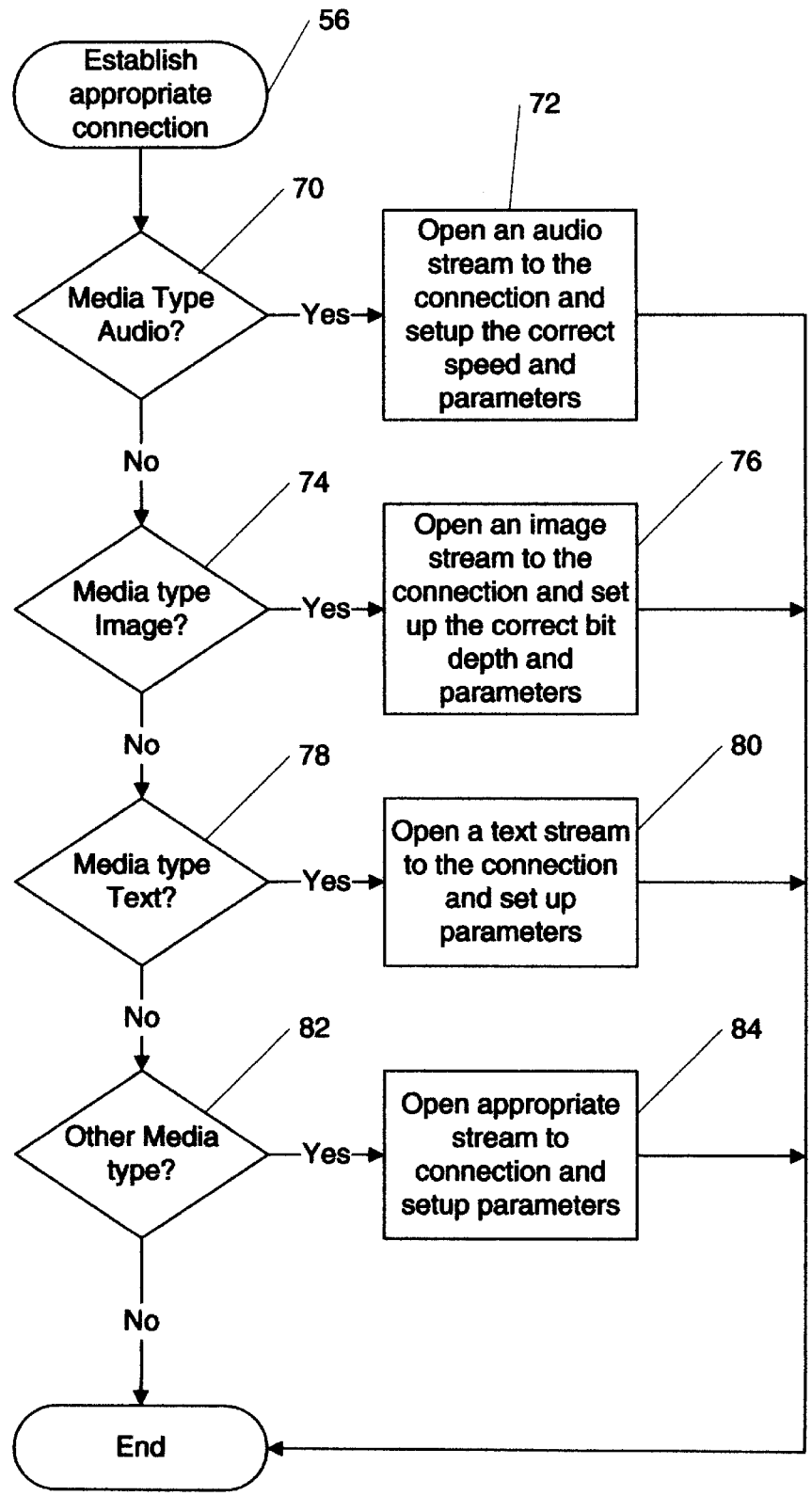
FIG. 4 is a flow chart of the operations of a connection establishing aspect of the present invention.

If the connection is valid, then the media manager establishes the appropriate connection type (block 56). The connection type established may depend upon the type of media accessed. For example, if the media is an audio clip then an audio stream connection may be established. The details of establishing the proper connection are illustrated in FIG. 4 and discussed below. After establishing the proper connection the media data is read from the media source (block 58). This data is then formatted based upon the type of media (block 60) and returned the formatted object returned to the application or applet (block 62).

The media manager may determine the location of the media object file utilizing the filename of the media object. For example, a local file may have a file name of "C:\filename.ext" and a media object file on the local server may be "filename.ext." Similarly, if the media object file is located on a third party server the format of the filename "HTTP//www.website.ext/filename.ext" could be utilized to determine that the file is located on a third party server and the media manager respond accordingly.

Thus, the media manager according to the present invention may automatically access the media file independent of the files location and transparent to the user. For example, in the case of the file location as the remote third party server 40 the media manager would create a connection to the remote URL setting up the correct protocols, read the data in a generic format and convert the data to the appropriate file format and provide the data to the application. If the media object is located on the remote server 30 then the location of the file is well known and just needs to be retrieved from the server. If the file is located locally then all that need be done is to determine the correct format for the file and handle the format appropriately. Thus, connection to the file may take varying forms based upon the location of the file.

FIG. 4 illustrates the operation of block 56 of FIG. 3. As seen in FIG. 4, the media manager determines the type of media that is to be accessed and establishes the appropriate connection based on the type of media. In block 70, it is determined if the media type is audio and if so an audio stream connection is set up with correct speed and other parameters (block 72). If the media to be accessed is not audio, then, if the media type is an image (block 74) an image stream to the connection is established and set up with the correct bit depth and other parameters (block 76). Similarly, if the media manager determines that the media type is text (block 78) then a text stream is established with the appropriate connection parameters (block 80). As is reflected by block 82, other types of media may also be supported according to the present invention with the appropriate connection being established for the other type of media (block 84). To utilize the present invention all that need be available is a mechanism for determining the type of media requested and a mechanism for establishing the proper connection for that data.

According to the present invention, the type of media requested may be determined from the extension of the filename of the media object file. Thus, for example, a "JPG" extension would indicate an image file. Similarly, a "WAV" extension may indicate an audio file. Thus, from the filename extension the type of media to be accessed may be determined and the appropriate connection established for that media type making the connection transparent to the user.

Figure 5:
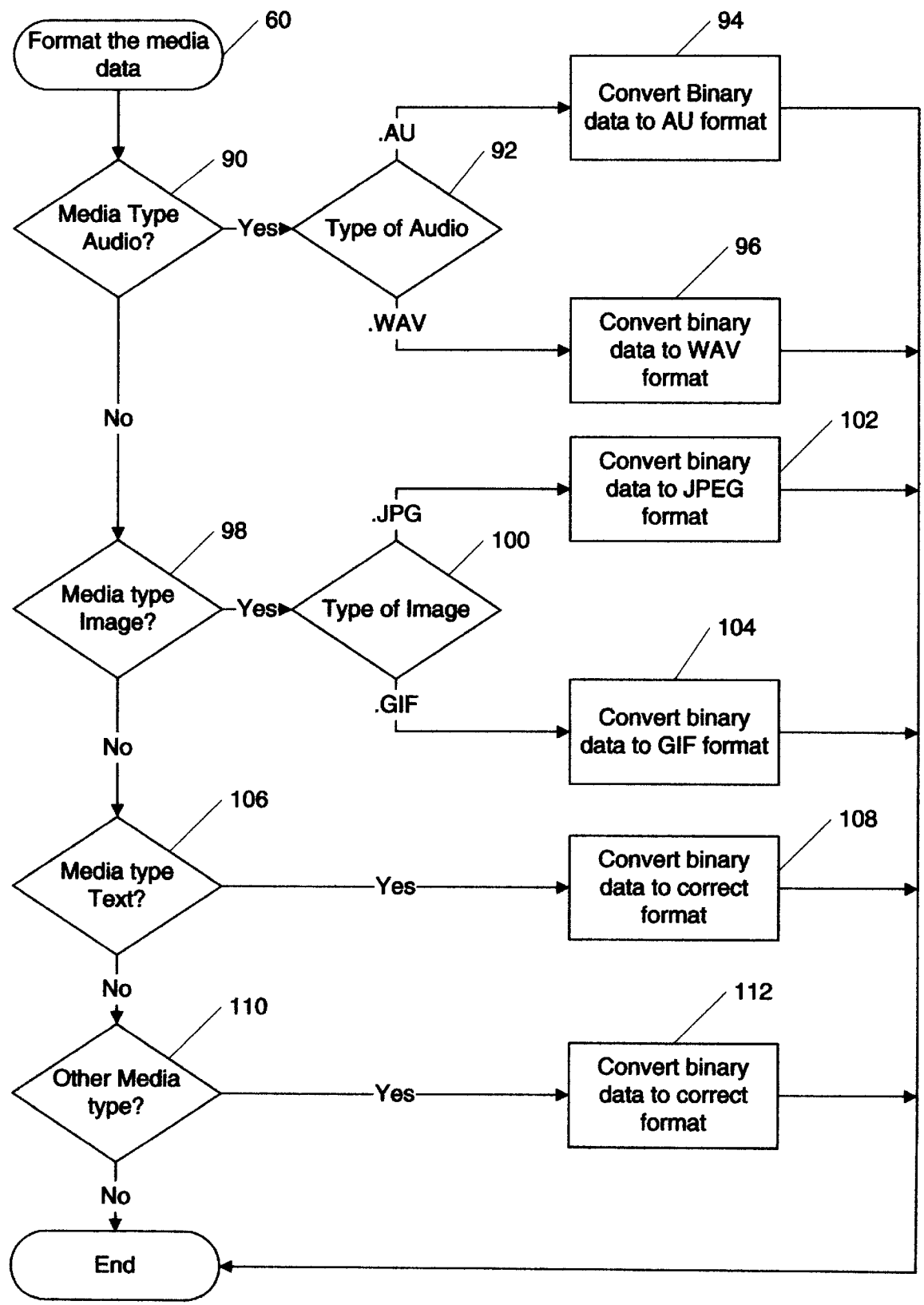
FIG. 5 is a flow chart of a data formatting aspect of the present invention.

FIG. 5 illustrates one embodiment of the formatting operation of block 60 of FIG. 3. As seen in FIG. 5, it may be determined if the media type is audio media (block 90) and the type of audio may be determined (block 92). If the file is a "wave" file then, based on the "WAV" extension of the filename, the binary formatted file may be converted to a WAV format (block 96). Similarly, if the audio file is an audio clip format, the then, based on the "AU" extension of the filename, the binary formatted file could be converted to an AU format (block 94).

If the media type is an image file, as determined at block 98, then the type of image file may be determined (block 100). If the file is a JPEG file, as specified by the "JPG" filename extension, then the binary data is formatted to the JPEG format. Similarly, if the file is a GIF file, as specified by the "GIF" filename extension, then the binary data is formatted to the GIF format.

As is seen in blocks 106, 108, 110 and 112, other formats of data for other media types may also be utilized with the present invention. As seen in block 106 text formatted data may be identified and converted (block 108). Similarly, other data formats may be identified (block 110) and appropriately converted (block 112).

According to the present invention, the format of the type of media requested may be determined from the extension of the filename of the media object file. For example, a "JPG" extension would indicate a JPEG image file. Similarly, a "WAV" extension may indicate a wave table audio file. Thus, from the filename extension the format of the type of media to be formatted may be determined and the data appropriately formatted to the specified media format making the formatting of the data transparent to the user.

The present invention has been described above with respect to specific formats of media data. However, as will be appreciated by those of skill in the art, other formats of media data such as TIF image files and the like may be utilized with the present invention. All that need be known to make the formatting of the data transparent to the user is the end format for the data and how to convert from the source data to the end format.

Figure 6:
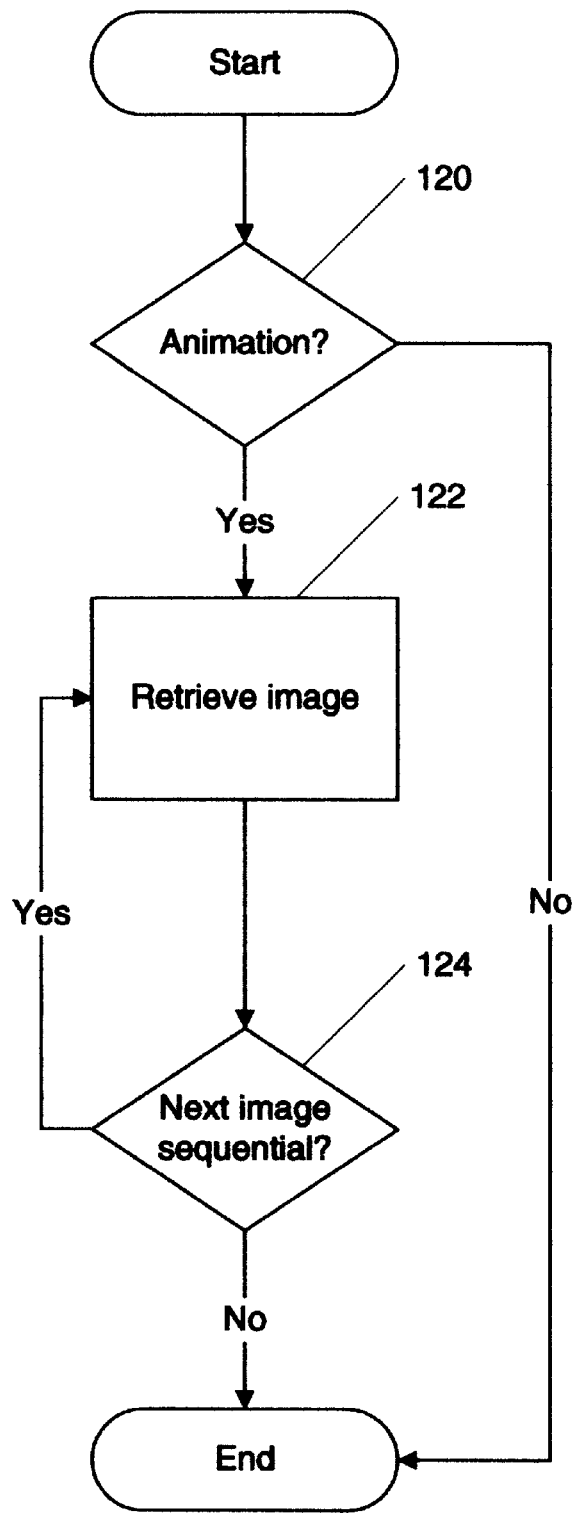
FIG. 6 is a flow chart of an animation aspect of the present invention.

FIG. 6 illustrates a further embodiment of the present invention which may be utilized to manage animations. As seen in FIG. 6, the media manager determines if the media request is for an animation (block 120). If the media object is an animation then the first image of the animation is retrieved (block 122). Images are then retrieved until a gap in the sequence of images is reached (block 124). These sequential images may then be considered the animation and may be formatted or otherwise processed as described above. The break in the sequence of images may be determined by examining the location of the images to determine, based upon the filename of the image, if the image is sequentially identified by the filename. Thus, for example, a filename such as IMAGE01.GIF may be the first image in the animation followed by IMAGE02.GIF and so on. When a break in the numbering of the image files is reached the media manager may use that break to indicate the end of the animation.

Such an animation mechanism may be readily utilized for animations which are local. However, certain programming languages, such as Java, may prevent access to animations which are stored remotely. The media manager of the present invention may account for this limitation if the number of images in the animation are provided to the media manager. Thus, by utilizing the filename of the animation images and the number of images in the animation, the media manager may assume the existence of the sequentially numbered image files at the remote location and retrieve them for use. For example, if there are 5 image files in an animation and the first image file is named IMAGE10.JPG, then the media manager will assume that the animation includes image files IMAGE11.JPG, IMAGE12.JPG, IMAGE13.JPG and IMAGE14.JPG. These files will be retrieved from the remote location as if they are individual images and then incorporated into the animation. Thus, the remote location limitations of existing programming languages may be overcome utilizing the present invention.

Additionally, the media manager of the present invention may allow for the creation of media libraries. In such a case, a media library allows the programmer to group media content into a self-containing/managing library. Various media libraries can contain the same media references only differing in how the media looks or sounds. Thus, a programmer can make one reference to media content and it will always be valid as long as the media library is present.

Figure 11B:
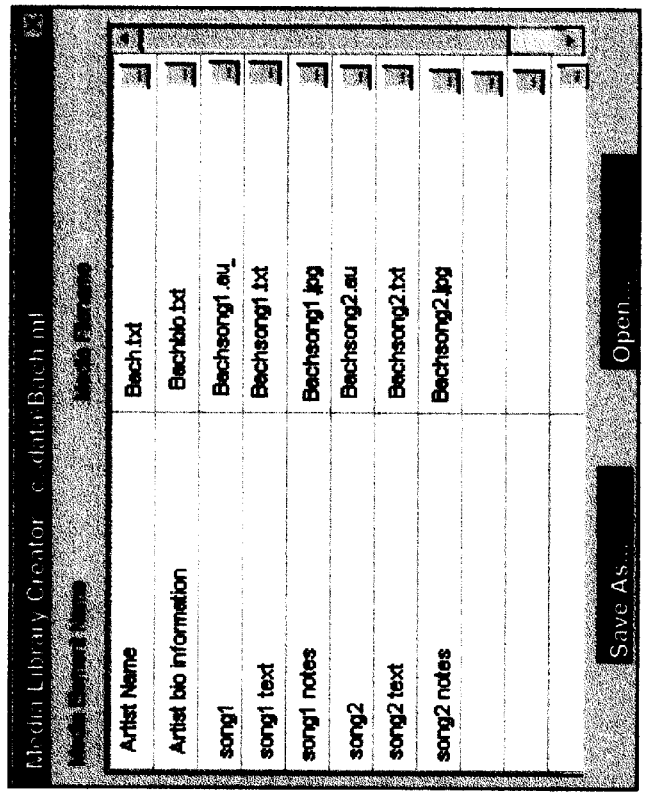
FIG. 11A and FIG. 11B are screen images of uses of a media library.
Figure 11A:
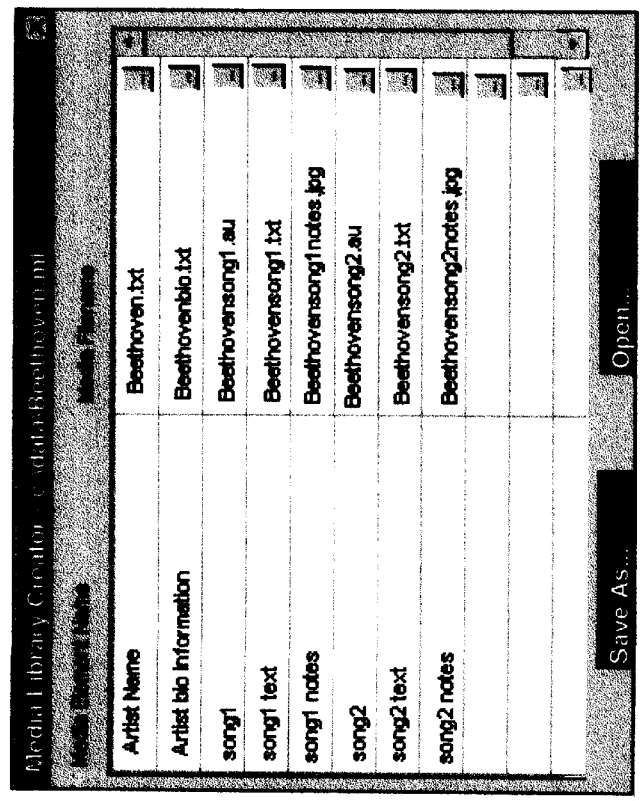

For example, if a programmer has developed an application that educates an end user about Beethoven, all of the media content of the application may be contained in a media library (FIG. 11A). References to the media may be done to indices into the library. Thus, the same application may be utilized to educate an end user about, for example, Bach, by changing the media library (FIG. 11B) while maintaining the same indices.

A media library is a collection of media elements(audio, image, text, etc . . . files) that is combined into a single entity(file), such that the data for each media element is arranged in the file by the name of the media. The file can be reduced for size and download time by using some form of compression when the media data is stored into the media library. The internals of a media library can be implemented in any of a number of ways known to those of skill in the art. One such way, is for the media library to be a class. The media library class could contain all of the media data in a hashtable where the key is the media element and the value is the name of the file and the data from the file. The media library class can have methods for adding and deleting media to/from a media library. Additionally there can be methods for accessing(retrieving) the data for the media out of a media library using the name of the media as a lookup key.

The way a media library is created depends on the way the internals of a media library are implemented. One such way is for a media library to be created by a dialog window that displays a grid (FIG. 11A). The name of the media element can be entered and the media file associated with that media element can be entered.

Such a media library may be accessed by a program which references the media library and the media name. For example, from the BeanMachine® illustrated interface (FIG. 8 discussed below), instead of specifying an image file, the user could specify a media library in 225. After selecting the media library, a dialog window is shown which displays all of the media in the selected media library, and allows the user to select which media element out of the library is to be used. This information (media library and media element) is then given to the media manager for it to load the media via the media library's access methods.

Figure 7:
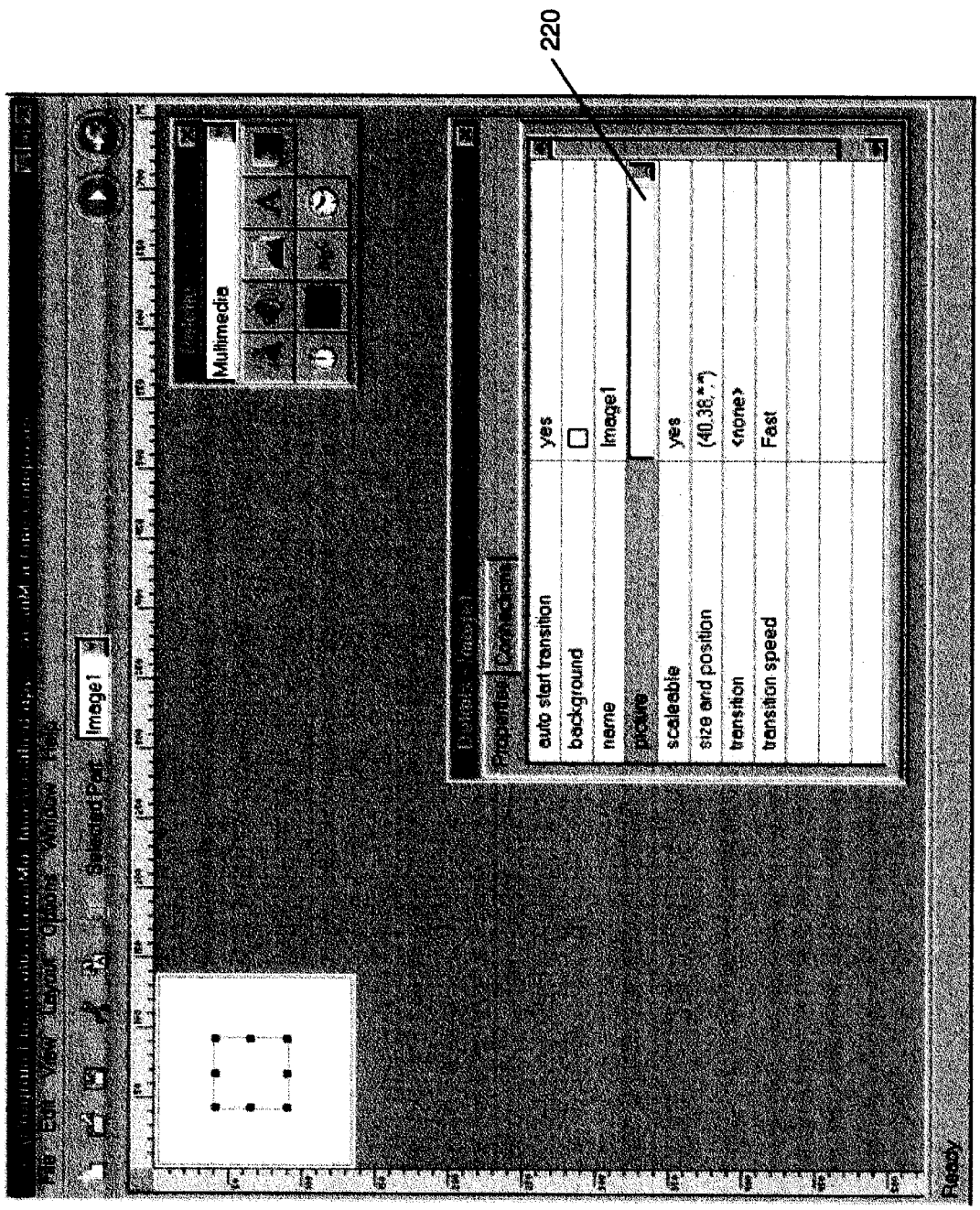
FIG. 7 through FIG. 10 are a screen images of a user interface utilizing the present invention.
Figure 8:
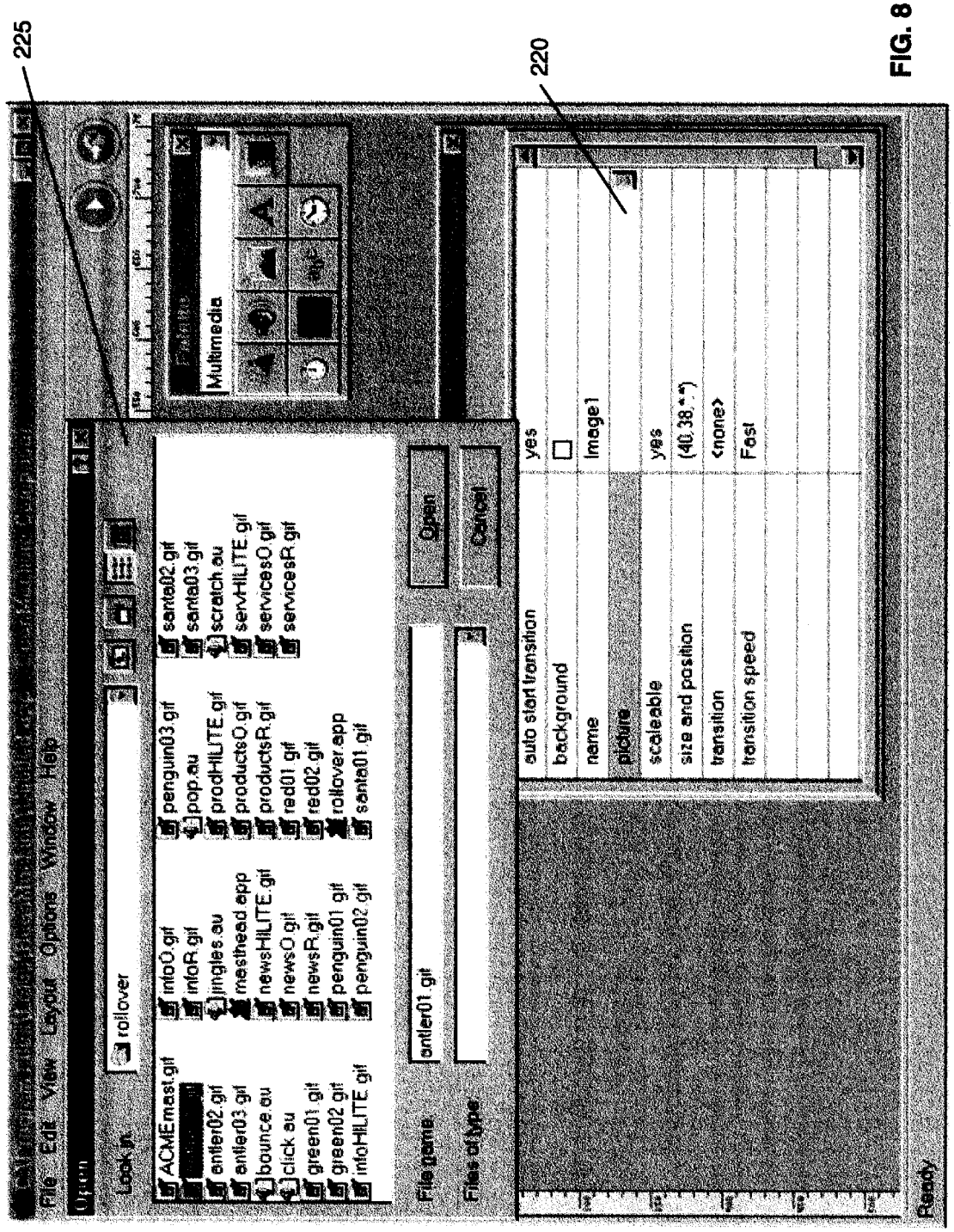
Figure 9:
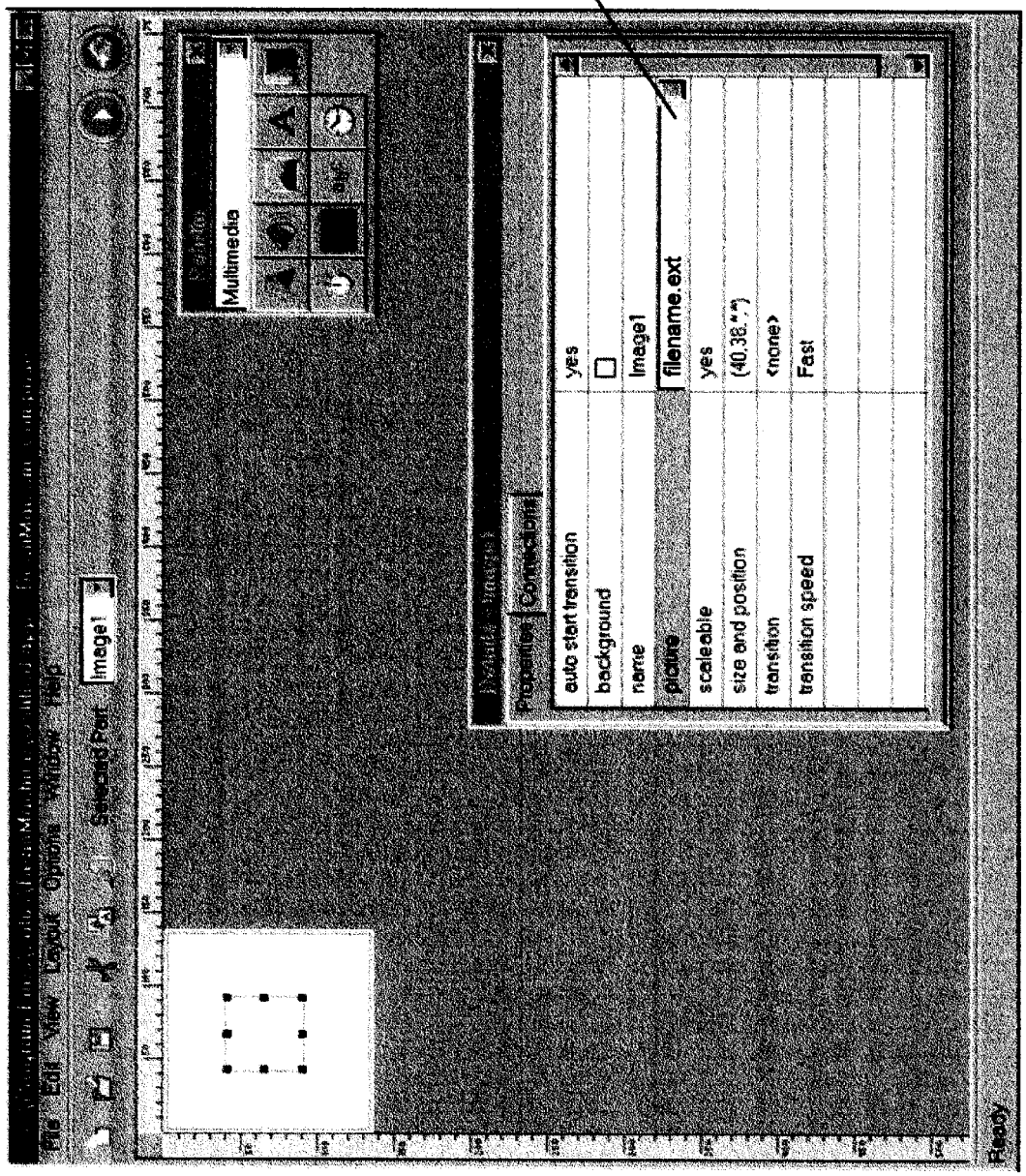
Figure 10:
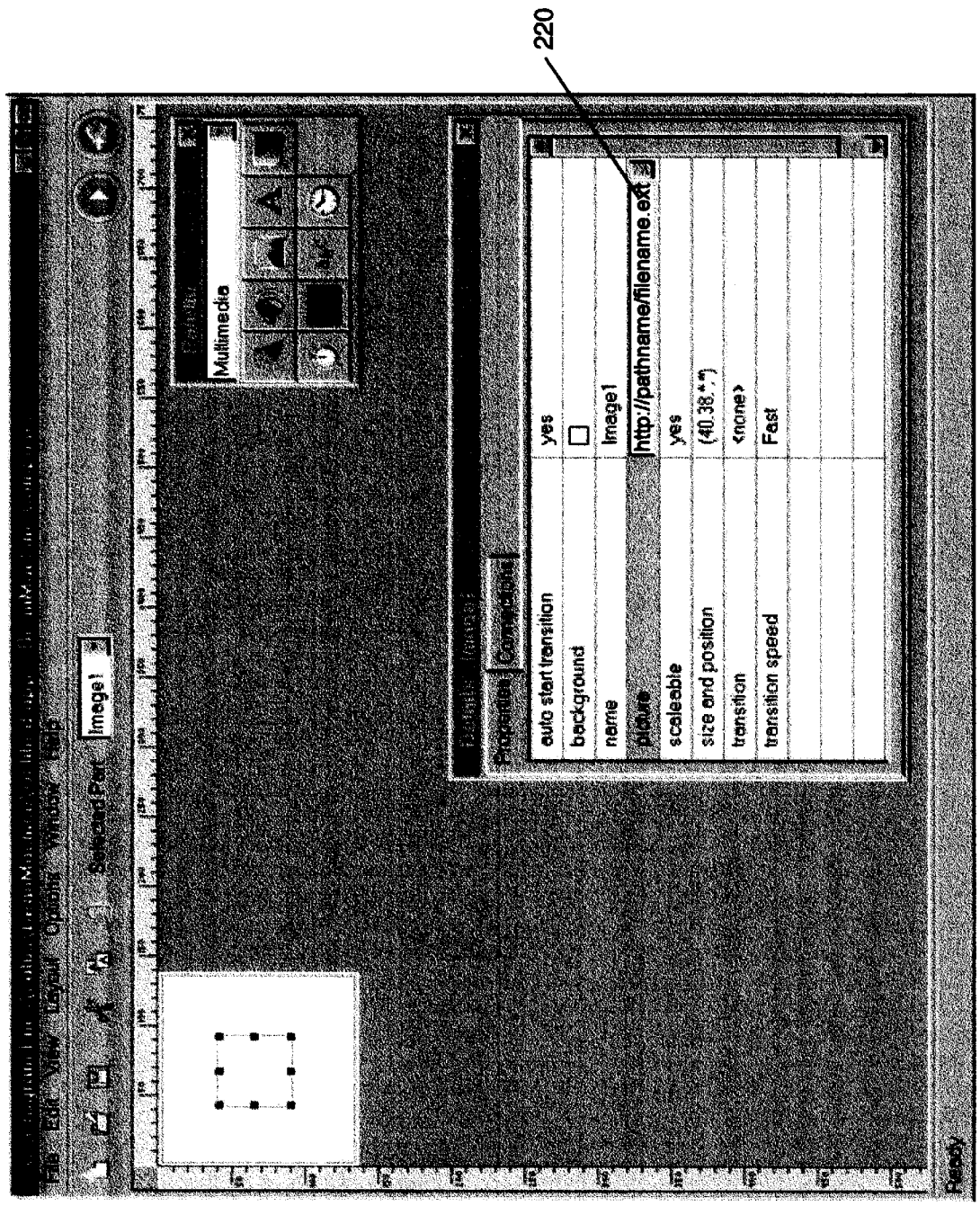

The use of the present invention may be illustrated in the screen captures provided as FIG. 7 through FIG. 10. As seen in FIG. 7, in Lotus® BeanMachine®, there is a single picture property 220 where the end user can enter an image file from any of three locations. As seen in FIG. 8, the user may select a local file via a file open dialog 225. FIG. 9 illustrates a user entering a remote file in the picture property by typing the filename in the property entry box 220. Finally, FIG. 10 illustrates the user entering a URL in the picture property 220.

Upon entry of the image location, the method for loading the media from one of the three defined locations is automatically selected based on the defined media location. Thus, the programmer can expose a single smart location for the media in the user interface as is illustrated in FIGS. 7 through 10. Such a smart interface is allowed because the method for loading media from one of the three defined locations is abstracted for the various types of media into a common interface for the programmer to call. Handling of the various formats for the files is done automatically by the media manager.

One manner in which the media manager of the present application may be embodied is as a class for use in an object orient programming language. In such a case the programmer would populate the class with media objects which would be operated on as defined by the logic of the class. The class would breakdown the location of a file into three components: the path, the filename and the extension. The path specifies the relative location of the file with respect to the end user's location. The filename is a unique identifier at the location of the file. The file extension typically specifies the format of the file contents. This class then determines the location of the media files relative to a running applet.

A class according to the present invention may include media access program logic for accessing storage locations where media types are stored. The class information may also include media access program logic for determining which type of the media types is stored at a storage location and for formatting the information stored at a storage location based upon the media type stored at the storage location. Similarly, the class information may include media access program logic for determining and retrieving the images of an animation. Such program logic may include logic for retrieving images until a break in the sequence of images is detected and may include logic for retrieving images of an animation from a remote location. Finally, a class according to the present invention may include media access program logic for accessing a media library based upon indices into the media library.

An example of a class according to the present invention is as follows:

```
class FileNameWrapper()
{
    String path;
    String filename;
    String extension;
    boolean isURL;

public FileNameWrapper(String fileReference)
    {
        path = extractPath(fileReference);
        isURL = locatePath(path);
        filename = extractFilename(fileReference);
        extension = extractExtension(fileReference);
    }

String extractPath(String fileReference)
    {
        //    method extracts path information from
              file reference passed
    }

String extractFilename(String fileReference)
    {
        //    method extracts file name information
              from file reference passed
    }

String extractExtension(String fileReference)
    {
        //    method extracts extension information
              from file reference passed
    }

Boolean locatePath(String path)
    {
        //    method determines whether file is
              located at a URL or on local file system
    }
} class MediaManager()
{
    Image getImage(FileNameWrapper imageFile)
    {
        //    method gets image from file and
              stores/returns in an image object
    }

AudioClip getAudio(FileNameWrapper audioFile)
    {
        //    method gets audio clip from file and
              stores/returns in an audio clip object
    }

Text getText(FileNameWrapper textFile)
    {
        //    method gets text from file and
              stores/returns in a text object
    }

Animation    getAnimation(FileNameWrapper
                 firstImageFile)
    {
        //    method gets all sequentially numbered
              image files with the firstImageFile that
              is passed in and stores/returns all in
              an animation object; utilizes getImage()
    }
    Animation    getAnimation(FileNameWrapper
                 firstImageFile, int
                 numOfAnimationFrames)
    {
        //    method determines name of
              numOfAnimationFrames sequentially
              numbered image files after the
              firstImageFile and then proceeds to load
              image files from remote location; all
              images retrieved are stored and returned
              in an animation object; utilizes
```

-continued

```
            getImage()
    }

Object  getMediaElement(FileNameWrapper
            mediaLibFile, int mediaIndex)
    {
        //  method retrieves media object stored at
            index mediaIndex within the media
            library referenced by mediaLibFile
    }

Object  getMedia(FileNameWrapper mediaFilename)
    {
        //  method returns appropriate media object
            based upon media stored in given file,
            mediaFilename; utilizes previously
            defined methods for actually returning
            correct object
        if ( //image )
        {
            return ( getImage(mediaFilename) );
        } else if ( //audio )
        {
            return ( getAudio(mediaFilename) );
        } else if ( ( //text )
        {
            return ( getText(mediaFilename) );
        }
        .
        .
        .
    }
}
```

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. An apparatus for use in a computer system having a memory and having access to a plurality of media types, the apparatus comprising:
   media access class information stored in memory, said media class information including media access program logic for accessing storage locations where the plurality of media types are stored and wherein the storage locations where the plurality of media types are stored include storage locations local to the computer system, storage locations at a server connected to the computer system or storage locations at a server remote to a server connected to the computer system; and
   wherein said media access class further comprises media access program logic for access a media content library based upon indices into the media content library.

2. An apparatus according to claim 1, wherein said media access class further comprises media access program logic for determining which type of the media types is stored at a storage location and for formatting the information stored at a storage location based upon the media type stored at the storage location.

3. An apparatus according to claim 2, wherein said media access program logic for determining which type of the media types is stored at a storage location makes such determination based upon a file extension in a filename of the stored information.

4. An apparatus according to claim 1 wherein said media access class further comprises media access program logic for retrieving animation image files and wherein said media access program logic for retrieving animation image files includes media access program logic for at least one of retrieving sequentially identified image files until a break in the sequence is detected and retrieving animation image files includes media access program logic for retrieving sequentially identified image files based upon an initial image file identifier and the number of image files in the animation.

5. An apparatus for use in a computer system having a memory and having access to a plurality of media types, the apparatus comprising:
   media access class information stored in memory, said media class information including media access program logic for accessing storage locations where the plurality of media types are stored and wherein the storage locations where the plurality of media types are stored include storage locations local to the computer system, storage locations at a server connected to the computer system or storage locations at a server remote to a server connected to the computer system; and
   wherein said media access program logic for accessing storage locations accesses a storage location based upon path information and a file identifier contained in a filename of the stored information.

6. A method according to claim 8, wherein said step of accessing the determined location comprises the steps of establishing a connection to the determined location wherein the type of connection established is based upon the determined type of media object.

7. A method according to claim 8, wherein said step of determining the location of a requested media object determines that the requested media object is stored at a third party server and wherein said step of accessing the determined location comprises the steps of:
   validating the location of the third party server;
   establishing a connection to the third party; and
   retrieving the requested media from the third party server.

8. A method of accessing media objects of a plurality of media types stored at a plurality of locations accessible to a computer system through a common interface, the method comprising the steps of:
   accepting user input requesting a media object;
   responsive to the user input requesting a media object, automatically carrying out the steps of:
      determining the location of a requested media object based upon an object identifier for the media object;
      determining the type of media object based upon the object identifier;
      accessing the determined location of the requested media object to retrieve the media object; and
      formatting the retrieved media object based upon the determined type of media object; and
   wherein the plurality of locations includes local to the computer system, local to a server connected to the computer system and local to a third party server accessible through the server connected to the computer system.

9. A method according to claim 6, wherein said step of establishing a connection comprises at least one of the step of establishing an audio stream connection if the determined type of the media object is an audio object and the step of establishing an image stream connection if the determined type of the media object is an image object.

10. A method of accessing media objects of a plurality of media types stored at a plurality of locations accessible to a computer system through a common interface, the method comprising the steps of:

accepting user input requesting a media object;
responsive to the user input requesting a media object, automatically carrying out the steps of:
   determining the location of a requested media object based upon an object identifier for the media object;
   determining the type of media object based upon the object identifier;
   accessing the determined location of the requested media object to retrieve the media object; and
   formatting the retrieved media object based upon the determined type of media object.

11. A method according to claim 10,
wherein said step of determining the type of media object based upon the object identifier comprises the step of evaluating an extension of a filename of the media object.

12. A method according to claim 10, wherein if said step of determining the type of media object determines that the media object is an animation media object, the method further comprising the steps of:
   retrieving a first of a plurality of images included in the animation media object;
   retrieving at least one of consecutively identified images until the next consecutively identified image is unavailable and a predefined number of the next consecutively identified images, wherein the predefined number corresponds to the number of images in the animation; and
   formatting the retrieved images as an animation.

13. A method according to claim 10, wherein the user input comprises indices into a media library.

14. A method according to claim 10, wherein said step of determining the location of a requested media object based upon an object identifier for the media object comprises the step of evaluating a path specification of a filename of the media object.

15. An apparatus for accessing media objects of a plurality of media types stored at a plurality of locations accessible to a computer system through a common interface comprising:
   means for accepting user input requesting a media object;
   means, responsive to the means for accepting user input requesting a media object, for automatically determining the location of a requested media object based upon an object identifier for the media object;
   means, responsive to the means for accepting user input requesting a media object, for automatically determining the type of media object based upon the object identifier;
   means, responsive to the means for accepting user input requesting a media object, for automatically accessing the determined location of the requested media object to retrieve the media object; and
   means, responsive to the means for accepting user input requesting a media object, for automatically formatting the retrieved media object based upon the determined type of media object; and
   wherein the plurality of locations includes local to the computer system, local to a server connected to the computer system and local to a third party server accessible through the server connected to the computer system.

16. A class object according to claim 21, wherein said media access class method further comprises:
   means for determining which type of the media types is stored at a storage location; and
   means for formatting the information stored at a storage location based upon the media type stored at the storage location.

17. A system according to claim 15, wherein said means for determining the location of a requested media object determines that the requested media object is stored at a third party server and wherein said means for accessing the determined location comprises:
   means for validating the location of the third party server;
   means for establishing a connection to the third party; and
   means for retrieving the requested media from the third party server.

18. A computer program product for accessing media objects of a plurality of media types stored at a plurality of locations accessible to a computer system through a common interface comprising:
   a computer readable storage medium having computer-readable program code means embodied in said medium, said computer-readable program code means comprising:
      computer-readable program code means for accepting user input requesting a media object;
      computer-readable program code means, responsive to the computer-readable program code means for accepting user input requesting a media object, for automatically determining the location of a requested media object based upon an object identifier for the media object;
      computer-readable program code means, responsive to the computer-readable program code means for accepting user input requesting a media object, for automatically for determining the type of media object based upon the object identifier;
      computer-readable program code means, responsive to the computer-readable program code means for accepting user input requesting a media object, for automatically accessing the determined location of the requested media object to retrieve the media object; and
      computer-readable program code means, responsive to the computer-readable program code means for accepting user input requesting a media object, for automatically formatting the retrieved media object based upon the determined type of media object; and
      wherein the plurality of locations includes local to the computer system, local to a server connected to the computer system and local to a third party server accessible through the server connected to the computer system.

19. A class object according to claim 16, wherein said means for determining which type of the media types is stored at a storage location makes such determination based upon a file extension in a filename of the stored information.

20. A computer program product according to claim 18, wherein said computer readable program code means for determining the location of a requested media object determines that the requested media object is stored at a third party server and wherein said computer readable program code means for accessing the determined location comprises:
   computer readable program code means for validating the location of the third party server;
   computer readable program code means for establishing a connection to the third party; and
   computer readable program code means for retrieving the requested media from the third party server.

21. A class object executing on an object oriented computer system for accessing a plurality of media types, the class object comprising:

a media access class method executing on said object oriented computer system for automatically accessing storage locations where a plurality of media types are stored and wherein the storage locations where the plurality of media types are stored include storage locations local to the computer system, storage locations at a server connected to the computer system or storage locations at a server remote to a server connected to the computer system; and wherein said media access class further comprises means for accessing a media content library based upon indices into the media content library.

22. A class object according to claim 21 wherein said media access class further comprises means for retrieving animation image files and wherein said means for retrieving animation image files includes at least one of means for retrieving sequentially identified image files until a break in the sequence is detected and means for retrieving animation image files includes means for retrieving sequentially identified image files based upon an initial image file identifier and the number of image files in the animation.

23. A class object executing on an object oriented computer system for accessing a plurality of media types, the class object comprising:

a media access class method executing on said object oriented computer system for automatically accessing storage locations where a plurality of media types are stored and wherein the storage locations where the plurality of media types are stored include storage locations local to the computer system, storage locations at a server connected to the computer system or storage locations at a server remote to a server connected to the computer system.

24. A class object according to claim 23, wherein said means for accessing storage locations accesses a storage location based upon path information and a file identifier contained in a filename of the stored information.

25. A system for accessing media objects of a plurality of media types stored at a plurality of locations accessible to a computer system through a common interface, comprising:

means for accepting user input requesting a media object;

means, responsive to the means for accepting user input, for automatically determining the location of a requested media object based upon an object identifier for the media object;

means, responsive to the means for accepting user input, for automatically determining the type of media object based upon the object identifier;

means, responsive to the means for accepting user input, for automatically accessing the determined location of the requested media object to retrieve the media object; and means, responsive to the means for accepting user input, for automatically formatting the retrieved media object based upon the determined type of media object.

26. A system according to claim 25, wherein said means for determining the type of media object based upon the object identifier comprises means for evaluating an extension of a filename of the media object.

27. A system according to claim 25, further comprising:

means, responsive to the means for determining the type of media object, for retrieving a first of a plurality of images included in the animation media object;

means, responsive to the means for determining the type of media object, for retrieving at least one of consecutively identified images until the next consecutively identified image is unavailable and a predefined number of the next consecutively identified images, wherein the predefined number corresponds to the number of images in the animation; and means, responsive to the means for determining the type of media object, for formatting the retrieved images as an animation.

28. A system according to claim 25, wherein the user input comprises indices into a media library.

29. An system according to claim 25, wherein said means for determining the location of a requested media object based upon an object identifier for the media object comprises means for evaluating a path specification of a filename of the media object.

30. A computer program product for accessing media objects of a plurality of media types stored at a plurality of locations accessible to a computer system through a common interface, comprising:

a computer readable storage medium having computer-readable program code means embodied in said medium, said computer-readable program code means comprising:

computer-readable program code means for accepting user input requesting a media object;

computer-readable program code means, responsive to the computer-readable program code means for accepting user input, for automatically determining the location of a requested media object based upon an object identifier for the media object;

computer-readable program code means, responsive to the computer-readable program code means for accepting user input, for automatically determining the type of media object based upon the object identifier;

computer-readable program code means, responsive to the computer-readable program code means for accepting user input, for automatically accessing the determined location of the requested media object to retrieve the media object; and computer-readable program code means, responsive to the computer-readable program code means for accepting user input, for automatically formatting the retrieved media object based upon the determined type of media object.

31. A computer program product according to claim 30, wherein said computer-readable program code means for determining the type of media object based upon the object identifier comprises computer-readable program code means for evaluating an extension of a filename of the media object.

32. A computer program product according to claim 30, further comprising:

computer-readable program code means, responsive to the computer-readable program code means for determining the type of media object, for retrieving a first of a plurality of images included in the animation media object;

computer-readable program code means, responsive to the computer-readable program code means for determining the type of media object, for retrieving at least one of consecutively identified images until the next consecutively identified image is unavailable and a predefined number of the next consecutively identified images, wherein the predefined number corresponds to the number of images in the animation; and computer-readable program code means, responsive to the computer-readable program code means for determining the type of media object, for formatting the retrieved images as an animation.

33. A computer program product according to claim 30, wherein the user input comprises indices into a media library.

34. A computer program product according to claim 30, wherein said computer-readable program code means for determining the location of a requested media object based upon an object identifier for the media object comprises computer-readable program code means for evaluating a path specification of a filename of the media object.

* * * * *